US010670751B2

(12) United States Patent
Qin et al.

(10) Patent No.: US 10,670,751 B2
(45) Date of Patent: Jun. 2, 2020

(54) FULL WAVEFORM INVERSION METHOD FOR SEISMIC DATA PROCESSING USING PRESERVED AMPLITUDE REVERSE TIME MIGRATION

(71) Applicant: CGG SERVICES SA, Massy (FR)

(72) Inventors: Botao Qin, Morangis (FR); Gilles Lambare, Saint Fargeau Ponthierry (FR)

(73) Assignee: CGG SERVICES SAS, Massy (FR)

( * ) Notice: Subject to any disclaimer, the term of this patent is extended or adjusted under 35 U.S.C. 154(b) by 323 days.

(21) Appl. No.: 15/080,729

(22) Filed: Mar. 25, 2016

(65) Prior Publication Data

US 2016/0282490 A1 Sep. 29, 2016

Related U.S. Application Data (60) Provisional application No. 62/138,999, filed on Mar. 27, 2015.

(51) Int. Cl.
*G01V 1/28* (2006.01)
*G01V 1/30* (2006.01)

(52) U.S. Cl.
CPC .............. *G01V 1/282* (2013.01); *G01V 1/303* (2013.01); *G01V 2210/614* (2013.01); *G01V 2210/67* (2013.01); *G01V 2210/679* (2013.01)

(58) Field of Classification Search
CPC .. G01V 1/282; G01V 1/303; G01V 2210/614; G01V 2210/67; G01V 2210/679
USPC .............................................. 702/14, 16, 17
See application file for complete search history.

(56) References Cited

U.S. PATENT DOCUMENTS

| 6,778,909 | B1 * | 8/2004 | Popovici | G01V 1/28 |
| | | | | 702/17 |
| 6,826,484 | B2 * | 11/2004 | Martinez | G01V 1/282 |
| | | | | 702/14 |
| 8,743,656 | B2 | 6/2014 | Herrmann et al. | |
| 9,291,734 | B2 * | 3/2016 | Liu | G01V 1/28 |
| 9,784,868 | B2 * | 10/2017 | Soubaras | G01V 1/28 |
| 2010/0265797 | A1 * | 10/2010 | Robertsson | G01V 1/366 |
| | | | | 367/43 |
| 2011/0090760 | A1 * | 4/2011 | Rickett | G01V 1/282 |
| | | | | 367/73 |

(Continued)

OTHER PUBLICATIONS

Allemand et al., "Combining Full Waveform Inversion and Tomography: Full Waveform Inversion-guided Tomography," 77th EAGE Conference & Exhibition 2015, IFEMA Madrid, Spain, Jun. 1-4, 2015.

(Continued)

*Primary Examiner* — Mohammed Shamsuzzaman
(74) *Attorney, Agent, or Firm* — Patent Portfolio Builders PLLC (57) ABSTRACT

A preserved-amplitude RTM-based FWI method is used to obtain an image of an explored subsurface formation. Model data corresponding to detected data is generated using a velocity model of the formation. Residuals representing differences between the modeled data and the detected data are back-propagated to then update the velocity model a local optimization based on a deconvolution formula employing a backward propagating wavefield and a forward propagating wavefield. Geophysical features of the formation are imaged based on the updated velocity model.

18 Claims, 10 Drawing Sheets

(56) References Cited

U.S. PATENT DOCUMENTS

| | | | | |
|---|---|---|---|---|
| 2011/0295510 | A1* | 12/2011 | Gulati | G01V 1/28 702/16 |
| 2012/0075954 | A1* | 3/2012 | Xu | G01V 1/303 367/38 |
| 2012/0316850 | A1* | 12/2012 | Liu | G01V 1/28 703/6 |
| 2013/0343154 | A1* | 12/2013 | Zhang | G01V 1/36 367/24 |
| 2015/0355356 | A1* | 12/2015 | Anderson | G01V 1/36 702/14 |
| 2015/0362622 | A1* | 12/2015 | Denli | G01V 99/005 703/2 |
| 2016/0187514 | A1* | 6/2016 | Dellinger | G01V 1/282 367/24 |

OTHER PUBLICATIONS

Allemand et al., "Full waveform inversion guided migration velocity analysis," SEG Technical Program Expanded Abstracts 2014, SEG Denver 2014 Annual Meeting, Oct. 26-31, 2014, pp. 4712-4717, Denver, CO.

Beylkin, "Imaging of discontinuities in the inverse scattering problem by inversion of a casual generalized Radon transform," Journal of Mathematical Physics, Jan. 1985, pp. 99-108, vol. 26, No. 1.

Bleistein, "On the imaging of reflectors in the earth," Geophysics, Jul. 1987, pp. 931-942, vol. 52, No. 7.

Bunks et al., "Multiscale seismic waveform inversion," Geophysics, Sep.-Oct. 1995, pp. 1457-1473, vol. 60, No. 5.

Duveneck, "A Pragmatic Approach for Computing Full-volume RTM Reflection Angle/azimuth Gathers," 75th EAGE Conference & Exhibition incorporating SPE EUROPEC 2013, Jun. 10-13, 2013, London, UK.

Guillaume et al., "Building Detailed Structurally Conformable Velocity Models with High Definition Tomography," 74th EAGE Conference & Exhibition incorporating SPE EUROPEC 2012, Jun. 4-7, 2012, Copenhagen, DK.

Guitton et al., "Smoothing imaging condition for shot-profile migration," Geophysics, May-Jun. 2007, pp. S149-S154, vol. 72, No. 3.

Forgues et al., "Parameterization Study for Acoustic and Elastic Ray+Born Inversion," Journal of Seismic Exploration, 1997, pp. 253-277, vol. 6, No. 2/3.

Jin et al., "Two-dimensional asymptotic iterative elastic inversion," Geophysical Journal International, Feb. 1992, pp. 575-588, vol. 108, No. 2.

Lailly, "The Seismic Inverse Problem as a Sequence of Before Stack Migrations," Conference on Inverse Scattering: Theory and Application, 1983, pp. 206-220, SIAM, Philadelphia, PA.

Martin et al., "Marmousi2: An elastic upgrade for Marmousi," The Leading Edge, Feb. 2006, pp. 156-166, vol. 25, No. 2.

Plessix et al., "Multiparameter full-waveform inversion: Marine and land examples," The Leading Edge, Sep. 2013, pp. 1030-1038, vol. 32, No. 9.

Pratt, "Seismic waveform inversion in the frequency domain, Part 1: Theory and verification in a physical scale model," Geophysics, May-Jun. 1999, pp. 888-901, vol. 64, No. 3.

Ratcliffe et al., "Full-waveform inversion of variable-depth streamer data: An application to shallow channel modeling in the North Sea," The Leading Edge, Sep. 2013, pp. 1110-1115, vol. 32, No. 9.

Tarantola, "Inversion of seismic reflection data in the acoustic approximation," Geophysics, Aug. 1984, pp. 1259-1266, vol. 49, No. 8.

Virieux et al., "An overview of full-waveform inversion in exploration geophysics," Geophysics, Nov.-Dec. 2009, pp. WCC1-WCC26, vol. 74, No. 6.

Xu et al., "3D angle gathers from reverse time migration," Geophysics, Mar.-Apr. 2011, pp. S77-S92, vol. 76, No. 2.

Zhang et al., "Amplitude-preserving reverse time migration: From reflectivity to velocity and impedance inversion," Geophysics, Nov.-Dec. 2014, pp. S271-S283, vol. 79, No. 6.

Zhang et al., "Practical issues in reverse time migration: true amplitude gathers, noise removal and harmonic source encoding," First Break, Jan. 2009, vol. 26.

Zhang et al., "True-amplitude, angle-domain, common-image gathers from one-way wave-equation migrations," Geophysics, Jan.-Feb. 2007, vol. 72, No. 1.

Extended Search Report in corresponding European Application No. EP 16 30 5346 dated Aug. 2, 2016. (Reference D4 was submitted with an Information Disclosure Statement dated May 17, 2016.)

B. Qin; "Full waveform inversion using preserved amplitude reverse time migration"; SEG Technical Program Expanded Abstracts, Aug. 19, 2015; pp. 1252-1257.

G. Lambare; "Stereotomograpy"; Geophysics; vol. 73, i, 5; pp. VE25-VE34; Sep. 2008.

* cited by examiner

FULL WAVEFORM INVERSION METHOD FOR SEISMIC DATA PROCESSING USING PRESERVED AMPLITUDE REVERSE TIME MIGRATION

CROSS REFERENCE TO RELATED APPLICATIONS

This application claims priority and benefit from U.S. Provisional Patent Application No. 62/138,999 filed on Mar. 27, 2015, for "Full waveform inversion using common shot preserved amplitude reverse time migration," the content of which is incorporated in its entirety herein by reference.

BACKGROUND

Technical Field

Embodiments of the subject matter disclosed herein generally relate to survey data processing, more particularly, to obtaining an image of an explored subsurface structure by minimizing differences between observed data and simulated data generated using a velocity model of the structure, with the velocity model iteratively enhanced while preserving amplitude in a selected data-acquisition-related domain.

Discussion of the Background

Seismic exploration of subsurface geophysical structures is customarily used to locate and monitor oil and gas reservoirs. Reflections of seismic waves traveling through the explored subsurface formation are detected by sensors (also known as "receivers") that record seismic signal versus time values, known as seismic data. Seismic data is processed to identify locations of layer interfaces crossed by the detected waves and the nature of the explored formation's layers, yielding a profile (image) of the formation. This type of seismic exploration is used for formations under land areas and under water bottom surfaces.

Figure 1:
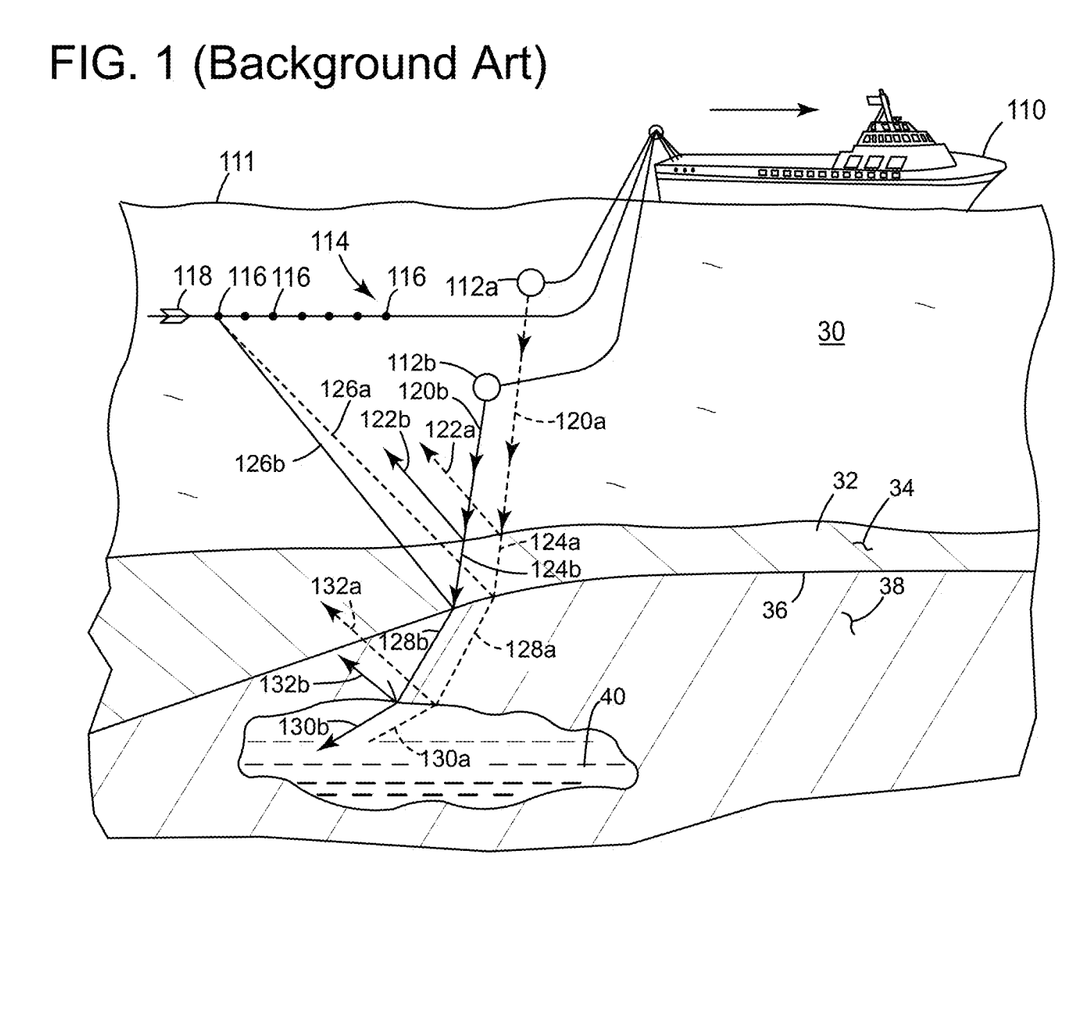
FIG. 1 illustrates seismic data acquisition.

FIG. 1 illustrates a marine seismic data acquisition system 100. In this vertical view, a vessel 110 tows seismic sources 112a and 112b and a streamer 114 at predetermined depths under the water surface 111. Although only one streamer is visible in this vertical view, plural streamers are typically spread in a three dimensional volume. Streamer 114, which has a tail buoy 118 and likely other positioning devices attached, houses receivers/sensors 116.

The seismic sources generate seismic waves such as 120a and 120b that propagate through the water layer 30 toward the seafloor 32. At interfaces (e.g., 32 and 36) between layers (e.g., water layer 30, first layer 34, and second layer 38) inside which the seismic waves propagate with different wave propagation velocity, the waves' propagation directions change as the waves are reflected and/or transmitted/refracted/diffracted. Seismic waves 120a and 120b are partially reflected as 122a and 122b and partially transmitted as 124a and 124b at seafloor 32. Transmitted waves 124a and 124b travel through first layer 34, are then reflected as waves 126a and 126b, and transmitted as 128a and 128b at interface 36. At the surface of reservoir 40, waves 128a and 128b are then partially transmitted as waves 130a and 130b and partially reflected as waves 132a and 132b. The waves traveling upward may be detected by receivers 116. Maxima and minima in the amplitude versus time data recorded by receivers carry information about the interfaces and traveling time through layers.

Seismic data analysis is complex because the recorded data is the result of interrelated physical processes and noise. Velocity models of the explored formation, which are representations of wave propagation velocity inside the formation, are often employed to simulate the acquired data. Reflected real or simulated data may be migrated in time or depth (i.e., re-localized at their positions parameterized in depth or in vertical time) using the formation's velocity model. Here the term "underground" refers not only to formations under land areas, but also to formations under the ocean floor. The velocity model may also take into consideration the different velocities through different ocean water layers due to currents, temperature, etc. If the layers are more or less homogenous, the velocity model is relatively simple. However, in reality, significant geophysical features must be considered. Such features include anisotropic velocity variations, complex geological formations such as salt and basalt structures, heavily faulted zones, anisotropic environments due to sedimentation or fracturing, overthrusts, shallow gas, etc. Velocity may also depend on the type of rock and depth, since rocks under pressure tend to have higher velocity.

Full waveform inversion (FWI) has been an important tool in building and improving velocity models (see, e.g., A. Tarantola's 1984 article, "Inversion of Seismic Reflection Data in the Acoustic Approximation," in *Geophysics*, 49, pages 1259-1266, the content of which is incorporated herein in its entirety). Classical FWI methods involve minimization of a square misfit (also known as "cost") function between the calculated (i.e., modeled) data and observed (real, acquired) data. The connection between migration and the gradient of FWI was identified early in FWI's history (see, e.g., P. Lailly's 1983 article, "The seismic inverse problem as a sequence of before stack migrations," in the Conference on Inverse Scattering, Theory and application, SIAM, Philadelphia, Pa., USA, Expanded Abstracts, pages 206-220, the content of which is incorporated herein in its entirety). Practically migration and gradient of FWI (used in the local non-linear optimization process) both involve the zero time lag cross-correlation of the propagated incident wavefield by the back-propagated reflected wavefield. This connection is valid for reflected waves, but not for diving waves. Indeed, while diving waves are generally muted in depth migration, they are critical to FWI's success (see, e.g., R. G. Pratt's 1999 article, "Seismic waveform inversion in the frequency domain, Part1: Theory and verification in a physical scale model," in *Geophysics*, 64, pages 888-901, the content of which is incorporated herein in its entirety). This difference, in addition to the non-linear aspect of FWI, implies that FWI is not fully equivalent to a migration plus a stratigraphic inversion. However, some interesting cross-fertilizations between these techniques are present.

It is desirable to improve FWI methods for obtaining high-resolution velocity models from reflected waves in a more reliable and faster manner than conventional FWI.

SUMMARY

The mentioned connection between migration and gradient of FWI offers opportunities for improving FWI from the know-how gained in migration. In various embodiments, a full waveform inversion (FWI) method is employed to generate velocity models. The velocity model is iteratively enhanced while preserving amplitude in a selected data-acquisition-related gathers (e.g., in a common shot domain, in a common receiver domain, in a common surface or subsurface offset domain, in a common angle domain, in a common plane-wave domain, etc.).

According to an embodiment, there is a method for obtaining an image of an explored subsurface formation. The method includes obtaining detected data related to waves traveling through the formation, generating modeled data corresponding to the detected data, using a velocity model of the formation, and back-propagating residuals representing differences between the modeled data and the detected data. The method further includes updating the velocity model using a local optimization based on a deconvolution formula employing a backward propagating wavefield and a forward propagating wavefield, and then imaging geophysical features of the formation based on the updated velocity model.

According to another embodiment, there is a seismic data processing apparatus having an interface configured to obtain detected data related to waves traveling through an explored subsurface formation, and a data processing unit. The data processing unit is configured to generate modeled data corresponding to the detected data using a velocity model of the formation, to calculate differences between the modeled data and the detected data, to back-propagate residuals representing the differences, to update the velocity model using a local optimization based on a deconvolution formula employing a backward propagating wavefield and a forward propagating wavefield, and to generate an image of geophysical features inside the explored subsurface formation based on the updated velocity model.

According to yet another embodiment, there is non-transitory computer readable medium storing executable codes which, when executed by a data processing unit having access to detected data related to waves traveling through an explored underground formation, perform a seismic data processing method. The method includes obtaining the detected data, generating modeled data corresponding to the detected data, using a velocity model of the formation, and back-propagating residuals representing differences between the modeled data and the detected data. The method further includes updating the velocity model using a local optimization based on a deconvolution formula employing a backward propagating wavefield and a forward propagating wavefield, and then imaging geophysical features of the formation based on the updated velocity model.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed in the context of processing seismic data. However, similar methods may be employed when other types of waves (e.g., electromagnetic waves) are used to explore an underground formation.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or in "an embodiment" in various places throughout the specification is not necessarily referring to the same embodiment. Further, the particular features, structures or characteristics may be combined in any suitable manner in one or more embodiments.

Figure 2:
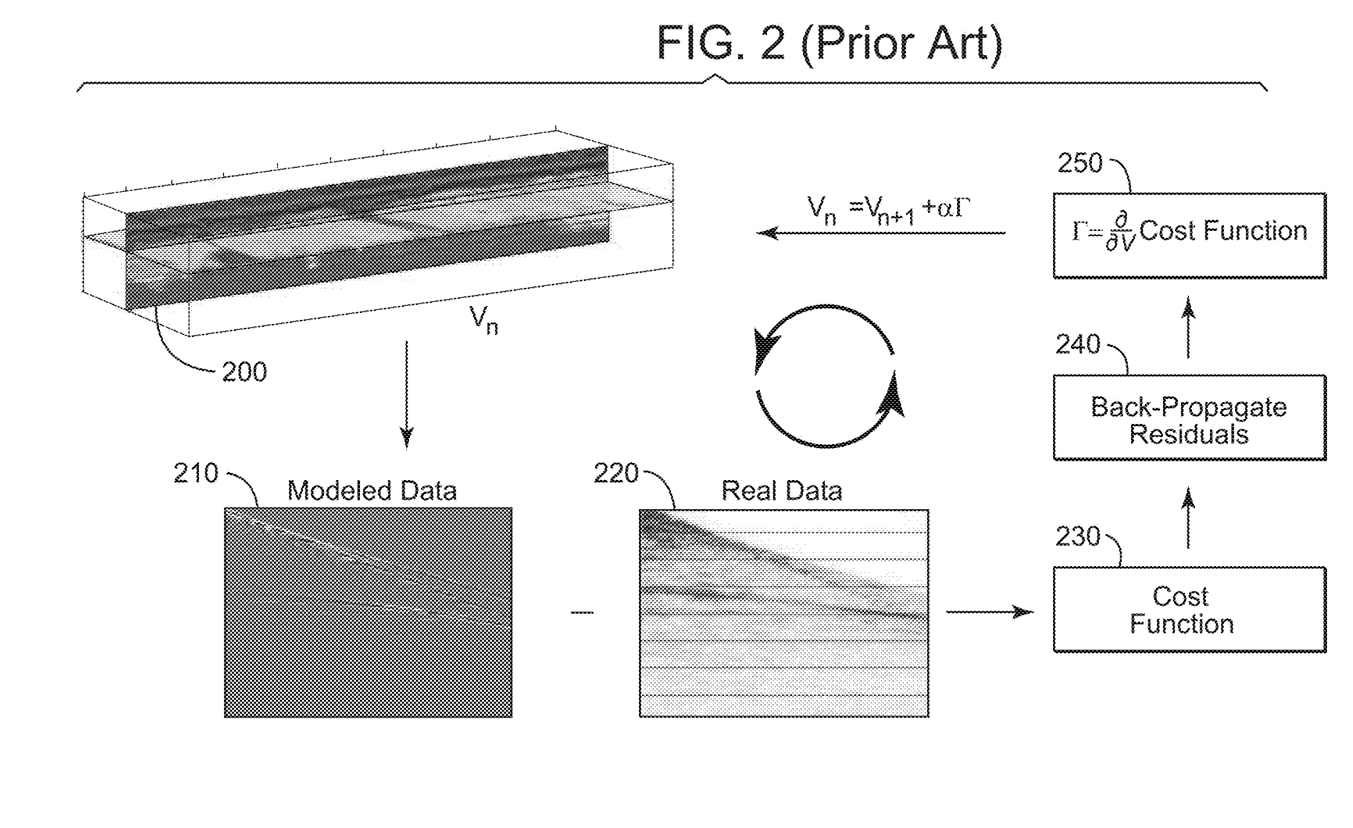
FIG. 2 illustrates a conventional FWI method.

FIG. 2 illustrates a conventional FWI method. Modeled data 210 is generated based on a velocity model 200 using the full-wave equation. A cost function 230 measures differences between modeled data 210 and real (i.e., receiver recorded) data 220. A model of the subsurface minimizing the cost function is sought. This model is determined though an iterative local minimization process, where an update of the velocity model is computed at each iteration. This update of the velocity model involves the gradient of the cost function potentially corrected by various corrective operators. For the computation of the gradient, the residuals representing the differences between modeled and real data are back-propagated at 240 and correlated with the forward propagated wave field from the considered source. The gradient of the cost function can be then obtained taking the zero time lag of the cross-correlation all over the image. At 250, this gradient is then used to estimate a velocity perturbation (or correction) added to a current velocity model at a current iteration, during a local optimization process, such that to decrease the cost function.

Thus, conventionally, an updated model $v_n$ is generated to replace model $v_{n-1}$ in a next iteration so as to decrease the cost function as indicated by its gradient. The circular arrows in the middle of FIG. 2 indicate that these steps are performed repeatedly, with the velocity model gradually enhanced through iterations.

Figure 3:
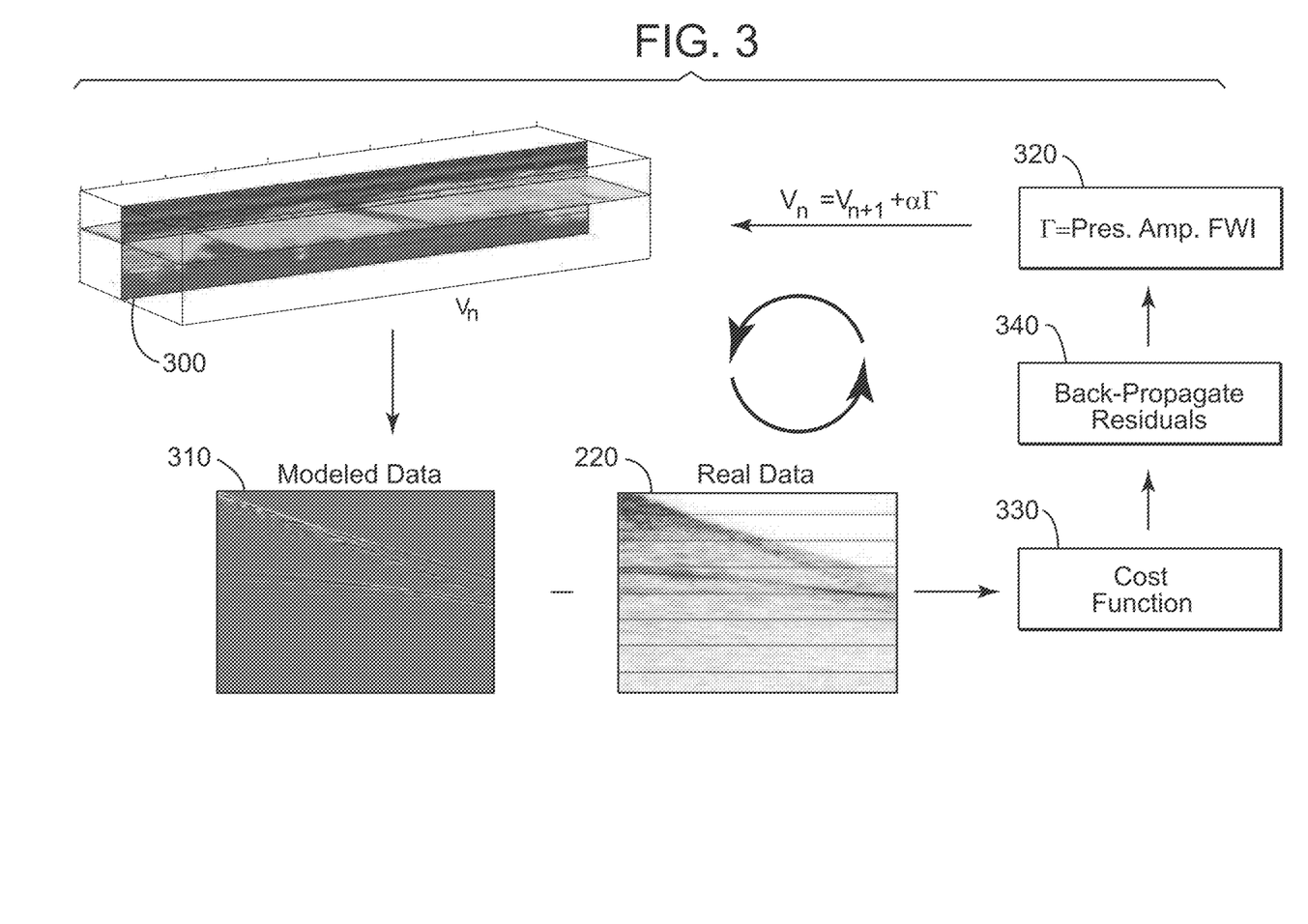
FIG. 3 illustrates an FWI method according to an embodiment.

Unlike in conventional FWI, in a preserved-amplitude RTM-based FWI method illustrated in FIG. 3, the velocity model perturbation/correction is not derived from the zero time lag cross-correlation of the forward and backward propagated wave fields, instead using the zero time lag deconvolution involving various combinations of the back and forward propagated wavefields. This approach is derived based on formula used in migration for improving amplitude recovery in migrated image, i.e., true or preserved amplitude migration (as described in Zhang, Y. and J. Sun's 2009 article "Practical issues of reverse time migration: True-amplitude gathers, noise removal and harmonic-source encoding," published in First Break, No. 26, pp. 19-25). In the context of FWI, this approach allows providing an improved estimation of the difference between the velocity model and the real underground structure (i.e., of the velocity perturbation/correction r at each iteration) thereby considerably improving the convergence rate of the iterative process compared to the conventional approach. The method may be implemented in a common shot domain, a common receiver domain, a common surface offset domain or a common subsurface offset domain, a common angle domain or a common plane wave domain, etc. Note that the plane wave domain for migration means that incident and reflected waves are plane waves (real ones or obtained by specific decompositions or summations).

As suggested in FIG. 3, modeled data 310 corresponding to the recorded data is generated based on velocity model 300 using the full-wave equation. A cost function 330, which measures differences between the modeled data 310 and the real (i.e., receiver recorded) data 220, may be calculated. Residuals representing differences between the modeled data and the real data are back-propagated at 340. An updated model $v_n$ is generated using the above-described new preserved amplitude RTM based FWI approach that allows to take advantage of the amplitude preserved migration based on a deconvolution imaging approach. As suggested by the circular arrows in the middle of FIG. 3, plural iterations may be performed until a predetermined criterion is met. The predetermined criterion may be related to convergence of the cost function, a number of iterations, difference between velocity models in successive iterations, etc.

The transition from a current velocity model to an updated velocity model may include applying various correction operators to the velocity change (for example, a weigh factor determined to minimize the cost function in the linearized case).

Figure 4:
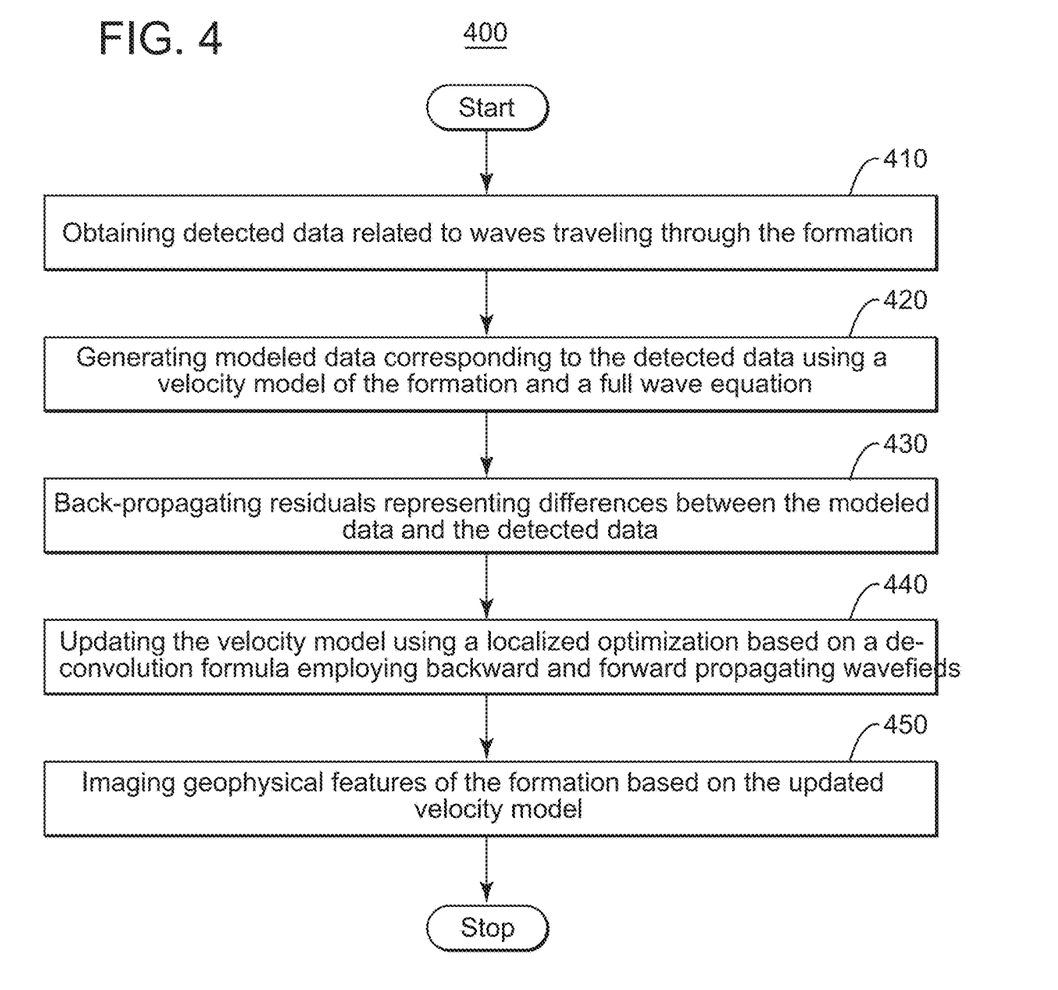
FIG. 4 is a flowchart of a method according to an embodiment.

FIG. 4 is a flowchart of a preserved-amplitude RTM-based FWI method 400 for obtaining an image of an explored subsurface formation, according to an embodiment. Method 400 includes obtaining detected data related to waves traveling through the formation at 410. Here, the term "obtaining" covers receiving (directly or a recording) data acquired by receivers, or retrieving the data from a data storage device.

Method 400 further includes generating modeled data corresponding to the detected data using a velocity model of the formation and full-wave equation at 420, back-propagating residuals representing differences between the modeled data and the detected data at 430. Method 400 further includes using a local optimization based on a deconvolution formula employing a backward propagating wavefield and a forward propagating wavefield at 440. Back-propagating the differences allows grouping them into gathers in in a common shot domain, a common receiver domain, a common surface offset domain, a common subsurface offset domain, a common angle domain or a common plane wave domain. The deconvolution formula corresponds to the domain in which the differences have been back-propagated.

The updating of the velocity model may include applying a corrective operator to a velocity perturbation calculated using the deconvolution formula. The updating may use a zero time lag deconvolution of a combination of back and forward propagated wavefields such that to improve amplitude recovery in a migrated image. The updated velocity model is then used to generate an image of geophysical features of the formation at 450.

The cost function may be calculated based on the formula:

$$E(v) = \|p_{obs}(x_r, t, x_s) - p_{cal}(x_r, t, x_s)\|^2 \quad (1)$$

$$= \sum_{x_r} \sum_{x_s} \int dt (p_{obs}(x_r, t, x_s) - p_{cal}(x_r, t, x_s))^2$$

where $p_{obs}$ represents the detected data, $p_{cal}$ represents the modeled data, $x_r$ represents a receiver position on a reference surface, $x_s$ represents a shot position, and t is time along a sequence of seismic signal values recorded at the receiver position after a shot at the shot position.

Amplitude Preservation Techniques

Amplitude preservation has been often studied in the context of migration, where it has been addressed using cross-correlation or deconvolution based imaging formulae. Within ray-plus-Born and ray-plus-Kirchhoff approximations, accurate and efficient migration/inversion formulas have been proposed and adopted by industry (see, e.g., G. Beylkin's 1985 article, "Imaging of Discontinuities in the Inverse Scattering Problem by Inversion of a Causal Generalized Radon Transform," in the *Journal of Mathematical Physics*, 26, pages 99-108; M. Bleistein's 1987 article, "On the imaging of reflectors in the earth," in *Geophysics*, 52, pages 931-942; and/or Jin et al.'s 1992 article, "Two dimensional asymptotic iterative elastic inversion," in *Geophys. J. Internat.*, 108, pages 575-588, the contents of which are incorporated herein in their entirety). More recently, these techniques have been extended to wave equation migration (see, e.g. Zhang et al.'s 2007 article, "True-amplitude, angle-domain, common-image gathers from one-way wave-equation migrations," *Geophysics*, 72, pages S49-S58, the content of which is incorporated herein in its entirety) and reverse time migration, RTM (see, e.g., Zhang and Sun's 2009 article, "Practical issues of reverse time migration: True-amplitude gathers, noise removal and harmonic-source encoding," in *First Break*, 26, pages 19-25, the content of which is incorporated herein in its entirety). A method to compute impedances and velocity perturbations (i.e., building a velocity model) derived from angle-domain preserved-amplitude RTM and involving a cross-correlation based imaging process has been proposed (see, e.g., Zhang et al.'s 2014 article, "Amplitude-preserving reverse time migration: From reflectivity to velocity and impedance inversion," in *Geophysics*, 79, pages S271-S283, the content of which is incorporated herein in its entirety). The use of angle-domain RTM allows separation of impedance and velocity, but also makes the method expensive in 3D (see, e.g., Xu et al.'s 2011 article, "3D angle gathers from reverse time migration," in *Geophysics*, 76, pages S72-S92, and/or Duveneck's 2013 article, "A pragmatic approach for computing full-volume RTM reflection angle/azimuth gathers," in the 75th Conference and Exhibition, EAGE, Expanded Abstracts, Tu-11-01, the contents of which are incorporated herein in their entirety), especially considering the iterative relaxation approach used by FWI.

Mathematical Formalism of Full Waveform Inversion Method for Seismic Data Processing Using Common Shot Amplitude Preserved Reverse Time Migration Consider a designatured shot record $p_{obs}(x_r,t,x_s)$, where $x_r$ is the receiver position on a reference surface, t is the time and $x_s$ is the shot position. In common-shot RTM, time lag cross-correlation of forward wavefield $p_F$ (i.e., from the source to a subsurface point where it is reflected/diffracted) and backward wavefield $p_B$ (i.e., from the subsurface point to the receiver) is zero, i.e.:

$$R(x,x_s) = \int dt p_F(x;t;x_s) p_B(x;t;x_s) \quad (2)$$

where $R(x,x_s)$ is the reflectivity and x the position in the migrated image (i.e., subsurface point) and $x_s$ is the shot position. In the acoustic isotropic assumption, the forward-propagated source wavefield $p_F$ satisfies:

$$\left(\frac{1}{v^2}\frac{\partial^2}{\partial t^2} - \rho \nabla \cdot \frac{1}{\rho} \nabla\right) p_F(x; t; x_s) = \delta(x - x_s)\delta(t), \quad (3)$$

and the backward-propagated receiver wavefield $p_B$ satisfies:

$$\begin{cases} \left(\frac{1}{v^2}\frac{\partial^2}{\partial t^2} - \rho\nabla\frac{1}{\rho}\cdot\nabla\right)p_B(x;t;x_s) = 0, \\ p_B(x,y,z=0;t;x_s) = p_{obs}(x,y;t;x_s), \end{cases} \quad (4)$$

where $v=v(x)$ and $\rho=\rho(x)$ denote velocity and density in the subsurface formation, respectively.

The high-frequency asymptotic expressions of $p_F$ and $p_B$ given in terms of source and receiver travel times and amplitudes are expressed in the time-frequency domain (w denotes the angular time frequency):

$$p_F(x;\omega;x_s) = \frac{SA_s}{\sqrt{\rho}}e^{-i\omega\tau_s}, \text{ and} \quad (5)$$

$$p_B(x;\omega;x_s) = \int dx 2i\omega\frac{\partial\tau_r}{\partial z}\frac{\overline{S}A_r}{\sqrt{\rho}}d(x_r,y_r;t,x_s)e^{i\omega\tau_r} \quad (6)$$

where $\tau_s = \tau_s(x;x_s)$ and $\tau_r = \tau_r(x;x_r)$ are the travel-times from the source and receiver to the subsurface point, respectively; $A_s = A(x;x_s)$ and $A_r = A(x;x_r)$ are amplitudes of the Green's functions from the source and receiver to the subsurface point, respectively; $S = S(\omega)$ is the signature of the Green's function, which depends on the dimension of the propagation; the bar over the function denotes the complex conjugate. The initial velocity $v_0$ is perturbed by $\delta v(x)=v-v_0$. If there is no density perturbation, the perturbed wavefield $\delta p$ can be approximated by the first order Born approximation:

$$\left(\frac{1}{v^2}\frac{\partial^2}{\partial t^2} - \rho\nabla\frac{1}{\rho}\cdot\nabla\right)\delta p(x,t;x_s) = \frac{2\delta v}{v_0^3}\frac{\partial^2}{\partial t^2}p(x,t;x_s) \quad (7)$$

Using known methods (e.g., as described in Beylkin's 1985 article, "Imaging of Discontinuities in the Inverse Scattering Problem by Inversion of a Causal Generalized Radon Transform," in the *Journal of Mathematical Physics*, 26, pages 99-108, or in Bleistein et al.'s 2001 book, *Mathematics of Multidimensional Seismic Imaging, Migration, and Inversion*, published by Springer-Verlag New York, Inc., the relevant contents of which are incorporated herein), the perturbed velocity model is written as a summation over the perturbed wavefield:

$$\delta v(x) = \frac{2v_0}{\pi\rho}\int\int dx_r d\omega\frac{\partial\tau_r}{\partial z}\cos^2\theta\frac{A_r^2}{G_sG_r}\delta p(x_r;\omega;x_s) \quad (8)$$

where $\theta=\theta(x_s,x,x_r)$ is the reflection angle; $G_s = G(x,\omega;x_s)$ and $G_r = G(x,\omega;x_r)$ are the Green's functions. Setting $\delta p$ as the data record d in the backward propagation $p_B$ of RTM in equation (4), and substituting relations (5) and (6) into equation (8), equation (8) may be rearranged into the following inversion formula:

$$\delta v(x) = \frac{v_0^3}{2\pi\rho}\int d\omega\frac{i}{\omega^3}\frac{\nabla p_B\cdot\nabla\overline{p}_F + p_B\nabla^2\overline{p}_F}{p_F\overline{p}_F}. \quad (9)$$

(i denotes the unit imaginary number) where the following set of high frequency approximations are used:

$$G(x,\omega;x_s)\approx S(\omega)A(x,x_s)e^{i\omega\tau(x,x_s)}$$

$$\nabla G(x,\omega;x_s)\approx i\omega\nabla\tau G(x,\omega;x_s)$$

$$\Delta G(x,\omega;x_s)\approx -(\omega\nabla\tau)^2 G(x,\omega;x) \quad (10)$$

Here, $\nabla$ denotes the gradient operator and $\Delta$ the Laplacian operator. The following high frequency approximation of the Rayleigh II formulae for the back-propagation of the residuals $\delta p$ is used $$p_B(x;\omega;x_s) \approx 2i\omega\int\int dx_r\frac{\partial\tau(x,x_r)}{\partial z_r}\overline{G}(x,\omega;x_r)\delta p(x_r,\omega;x_s). \quad (11)$$

where $z_r$ is the vertical component of receiver position vector $x_r$.

Equation (9) contains a deconvolution formula, where signal $$\frac{i}{\omega^3}\nabla p_B\cdot\nabla\overline{p}_F + p_B\nabla^2\overline{p}_F$$

is deconvolved by signal $p_F\overline{p}_F$. The denominator in (9) is the same as in the deconvolution imaging condition of RTM, and requires applying some stabilization (as, e.g., in Guitton et al.'s 2007 article, "Smoothing imaging condition for shot profile migration," in *Geophysics*, 72, pages S149-S154, the content of which is incorporated herein in its entirety). In practice, the following formula is used:

$$p_F\overline{p}_F = \langle(p_F\overline{p}_F)\rangle + \varepsilon(x) \quad (12)$$

where $\langle\rangle$ is a spatial smoothing operator with suitable smoothing windows, and $\varepsilon$ is an additive damping factor which depends on the location of the window on which the optimization is applied. Compared to the approach set forth in Zhang et al.'s 2014 article (i.e., "Amplitude-preserving reverse time migration: From reflectivity to velocity and impedance inversion," in *Geophysics*, 79, S271-S283, the content of which is incorporated herein in its entirety), which also took advantage of true or preserved amplitude formulae in FWI, in this embodiment, an updated model is achieved using a deconvolution approach rather than a cross-correlation approach. Additionally, in some embodiments, the common-shot implementation is simpler and less computationally intensive than Zhang's common-angle approach. In one embodiment, velocity and density are optimized jointly.

Figure 5:
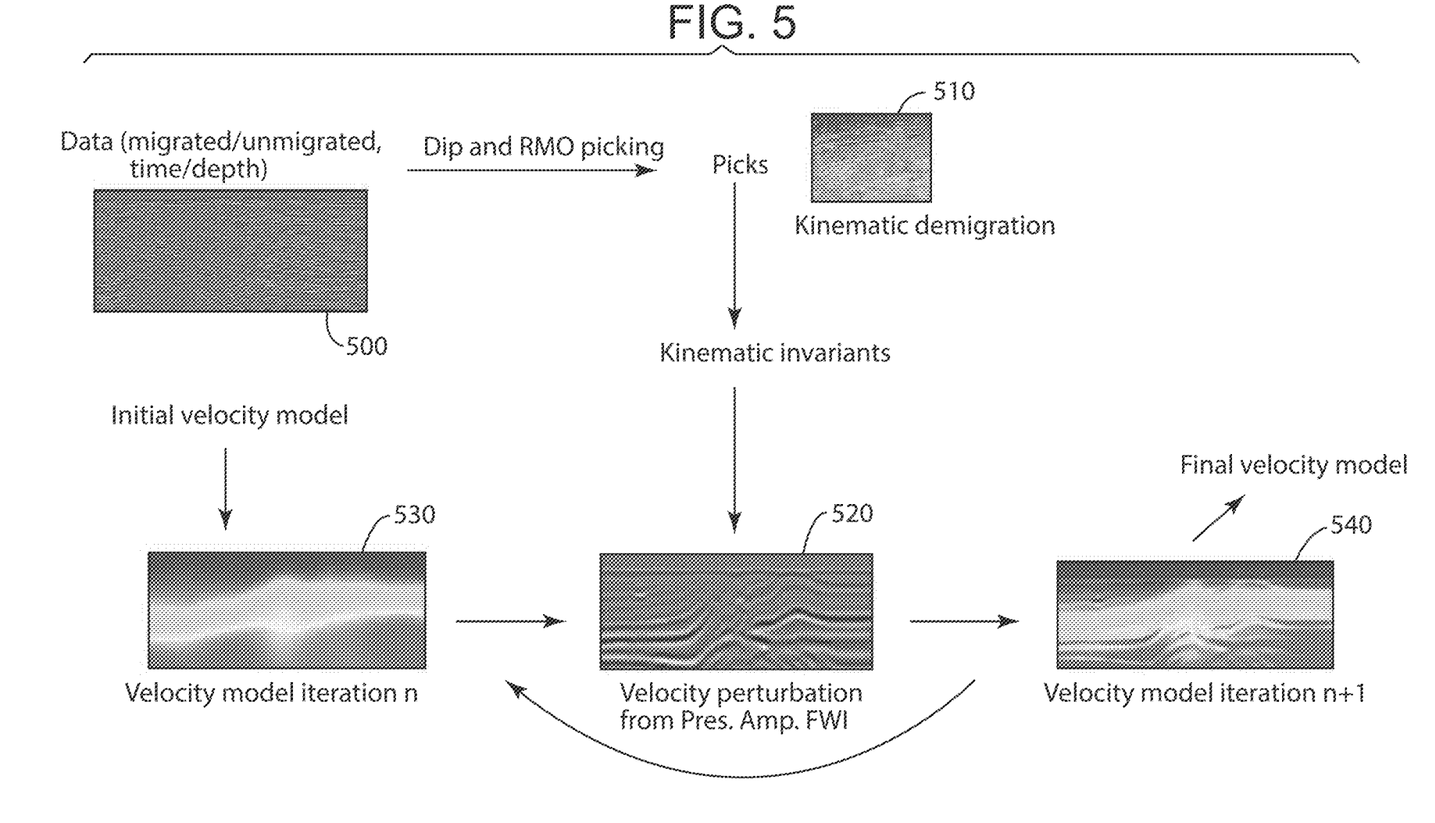
FIG. 5 illustrates the manner of determining velocity model according to an embodiment.

FIG. 5 is a graphical illustration of the use of a preserved-amplitude RTM-based FWI method in FWI-guided tomography (as described in Thibaut Allemand and Gilles Lambaré's 2015 article "Combining Full Waveform Inversion and Tomography: Full Waveform Inversion-guided Tomography" published in 77th EAGE Conference and Exhibition, Extended Abstracts). The kinematic invariants can be estimated by kinematic demigration of the dip and residual move-out of locally coherent events picked on time or depth migrated data or directly by picking slopes of locally coherent events in the detected data 500 (see, e.g., G. Lambaré's 2008 article "Stereotomography," published in *Geophysics*, 73(5), pp. VE25-VE34). The velocity perturbation 520 (i.e., r in FIG. 3) can be then determined as a smooth scaling of the result of the preserved-amplitude RTM-based FWI (the guide) in such a way to fit the kinematic invariants, to update velocity model 530 to velocity model 540.

Comparison of Conventional FWI and Preserved-Amplitude RTM-Based FWI

The reliability and efficiency of a preserved-amplitude RTM-based FWI is demonstrated by comparing this method's results with the results obtained with conventional FWI applied for the synthetic Marmousi II model (described in Martin et al.'s 2006 article, "Marmousi 2: An elastic upgrade for Marmousi," in The Leading Edge 25, pages 156-166, the content of which is incorporated herein in its entirety). This model, which is simplified to a constant-density isotropic acoustic model, is partially illustrated in FIG. 6, but extends laterally. A 500 m thick water layer is added at the top. Different nuances of gray in FIGS. 6-9 (which are vertical slices) represent different wave propagation velocities in the range 1,100-4,500 m/s. Lines 610, 620 and 630 represent wells used for further comparisons between the Marmousi II model, conventional FWI results and preserved-amplitude RTM-based FWI results.

The data (serving as detected data and, thus, the FWI start point) are generated by finite differences for a marine-towed streamer acquisition with offsets ranging from 0 to 3 km. The source function is a Dirac function band-pass filtered within [3, 60] Hz.

Figure 7:
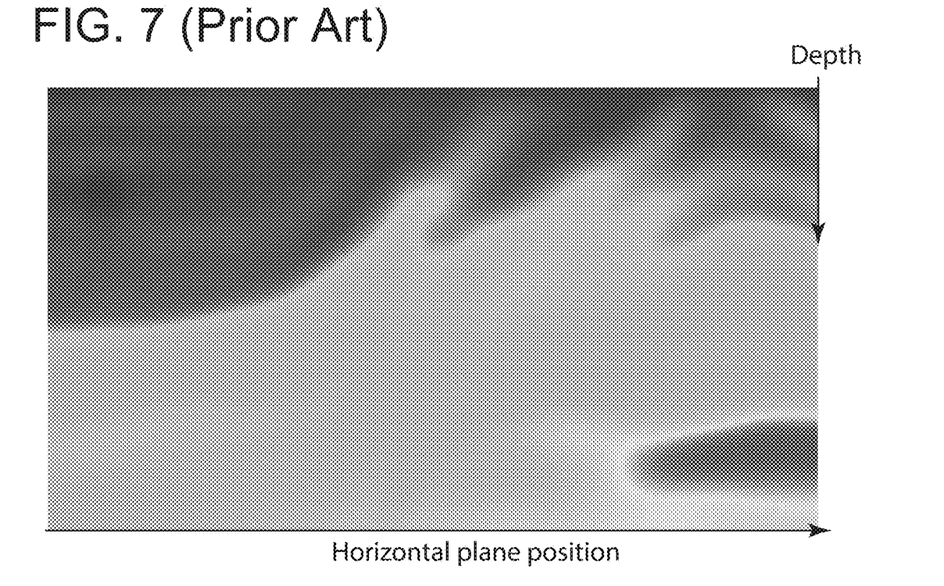
FIG. 7 represents an initial velocity model.
Figure 8:
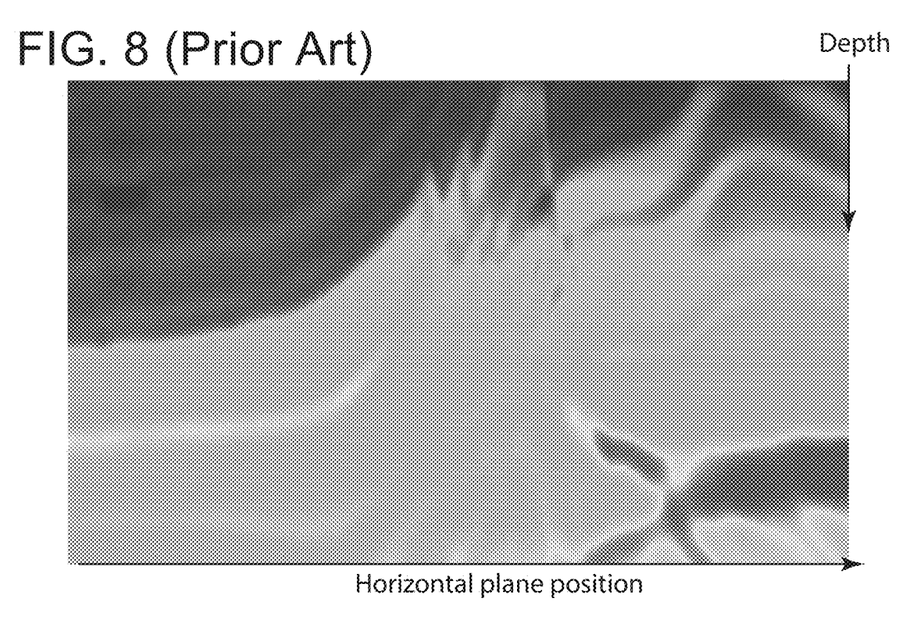
FIG. 8 represents results of conventional FWI.

High-definition tomography (as, e.g., described in Guillaume et al.'s 2012 article, "Building Detailed Structurally Conformable Velocity Models with High Definition Tomography," EAGE extended abstract, W002, the content of which is incorporated herein in its entirety) has been applied to obtain the initial model illustrated in FIG. 7. Conventional FWI (as described in Ratcliffe et al.'s 2013 article, "Full-waveform inversion of variable-depth streamer data: an application to shallow channel modelling in the North Sea," in The Leading Edge, September 2013, pages 1110-1115, the content of which is incorporated herein in its entirety) is applied starting from 4 Hz (a reasonable starting frequency in real cases). This conventional FWI updates the initial velocity model in a 4 Hz to 11 Hz multi-scale inversion process for six frequency ranges that are defined, with the method iterated six times in each range. The resulting updated velocity model is illustrated in FIG. 8.

Figure 9:
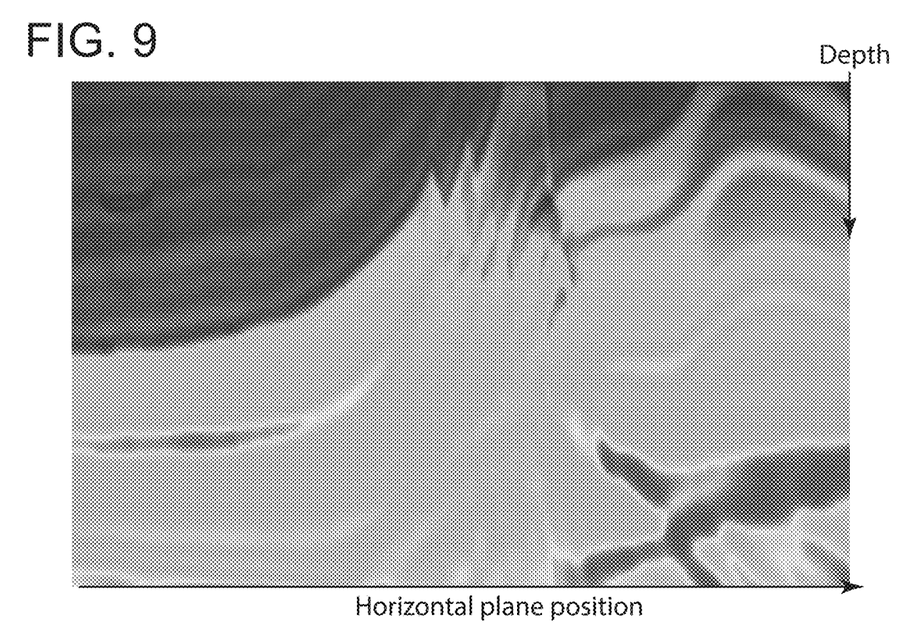
FIG. 9 represents the results of a method according to an embodiment.

Preserved-amplitude RTM-based FWI is applied in the same frequency ranges as conventional FWI, with only one iteration performed in each range. The updated velocity model obtained in this manner is illustrated in FIG. 9. Comparison of FIGS. 8 and 9 reveals that preserved-amplitude RTM-based FWI improves the convergence achieving similar results in fewer iterations than conventional FWI.

Figure 10:
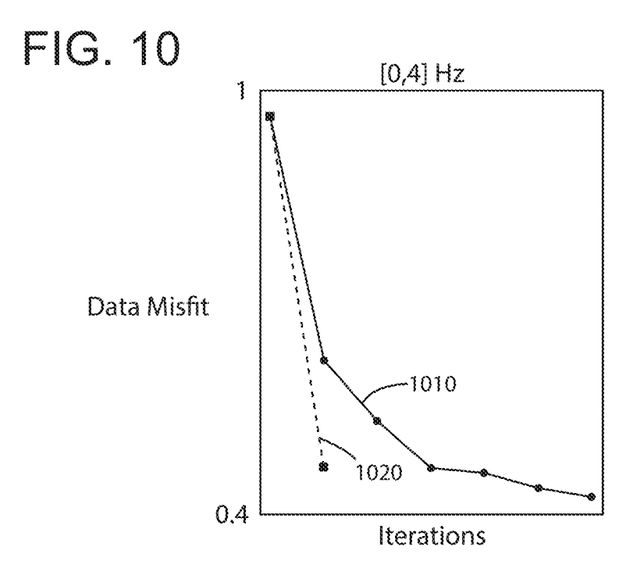
FIG. 10 is a graph showing the cost function evolution.

Improved convergence is confirmed by the more rapid decrease of the cost function for preserved-amplitude RTM-based FWI than conventional FWI as illustrated in FIG. 10. The vertical axis of FIG. 10 graph represents data misfit between the exact and the modeled data, normalized to a start value, with the horizontal axis representing the number of iterations. Line 1010 represents the results of conventional FWI, and dashed line 1020 represents the results of the preserved amplitude RTM based FWI according to an embodiment.

Figure 6:
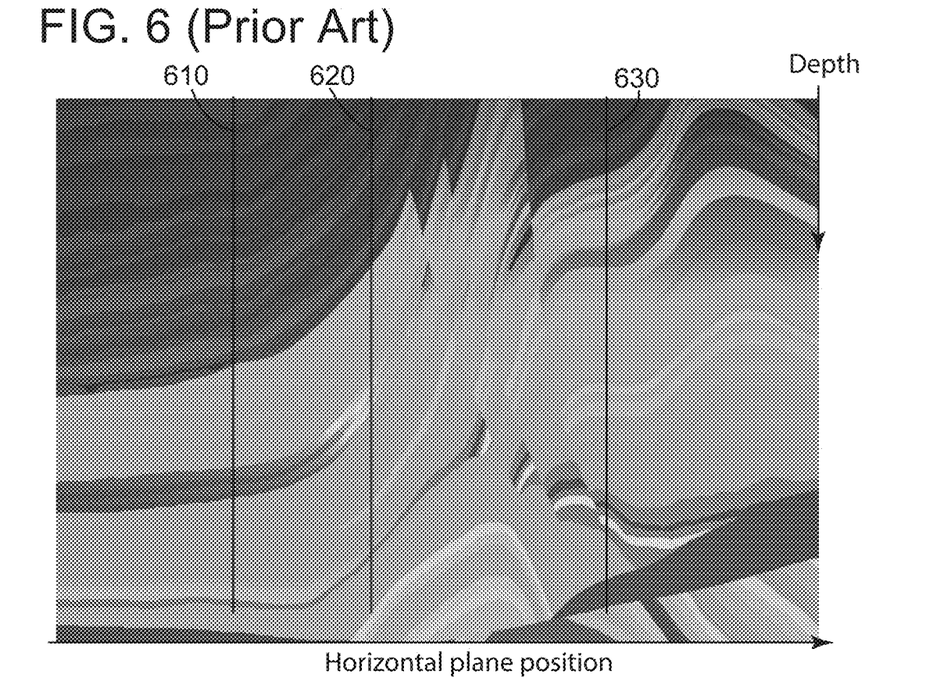
FIG. 6 illustrates a portion of a Marmousi II model.
Figure 11:
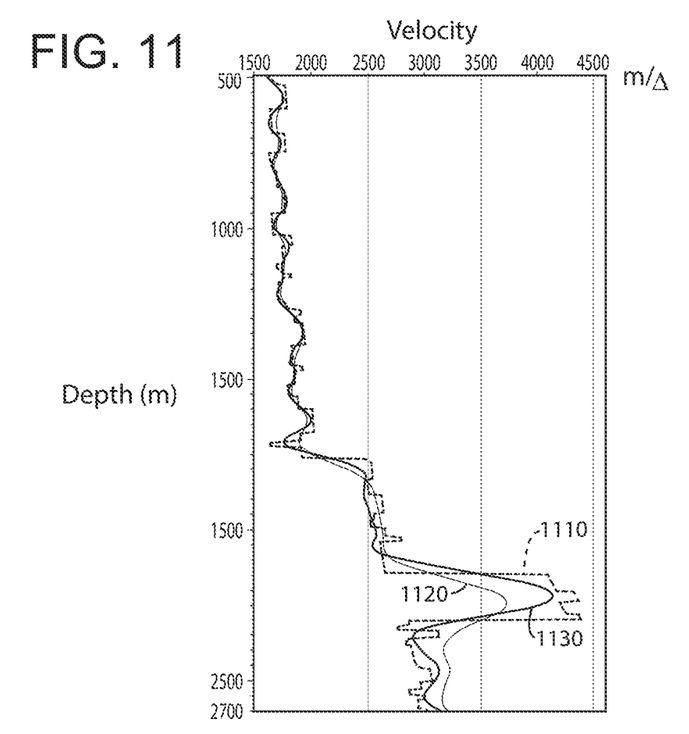
FIGS. 11-13 are graphs of velocity versus depth for three wells in the Marmousi II model.
Figure 12:
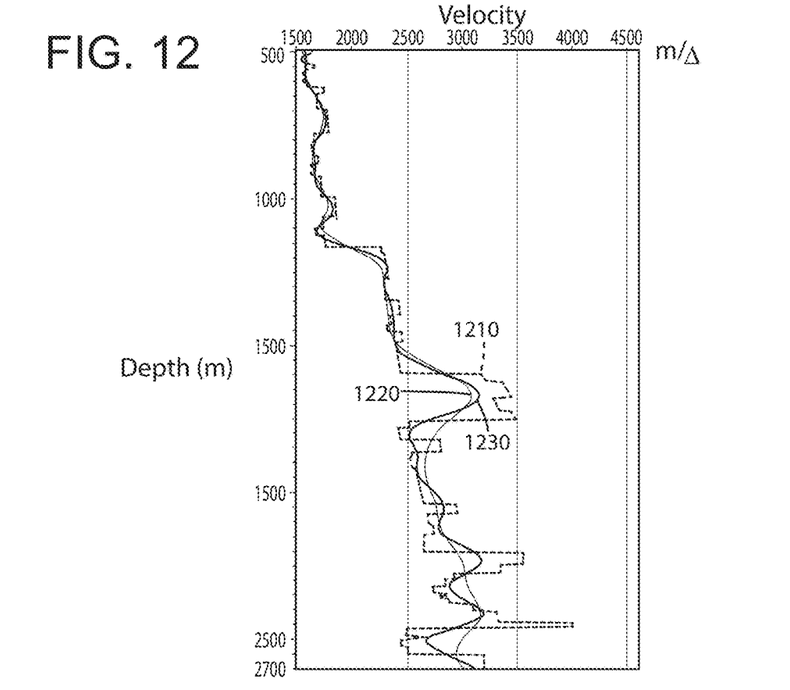
Figure 13:
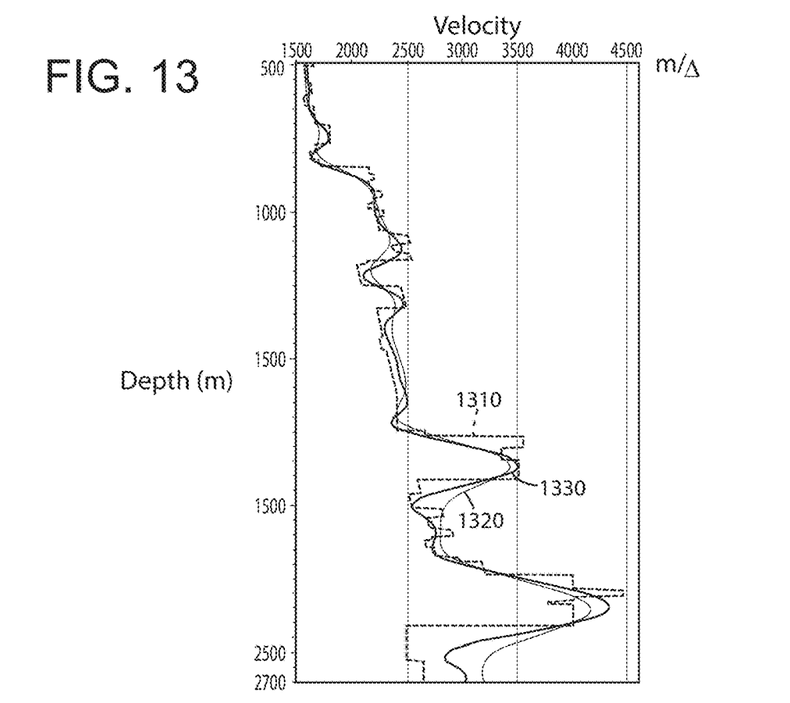

FIGS. 11, 12 and 13 are graphs of velocity versus depth for wells 610, 620 and 630 in FIG. 6, respectively. Velocity values obtained with preserved-amplitude RTM-based FWI (lines 1130, 1230 and 1330, respectively) match the true model (lines 1110, 1210 and 1310) better than velocity values obtained after six iterations using conventional FWI (lines 1120, 1220 and 1320, respectively).

Figure 14:
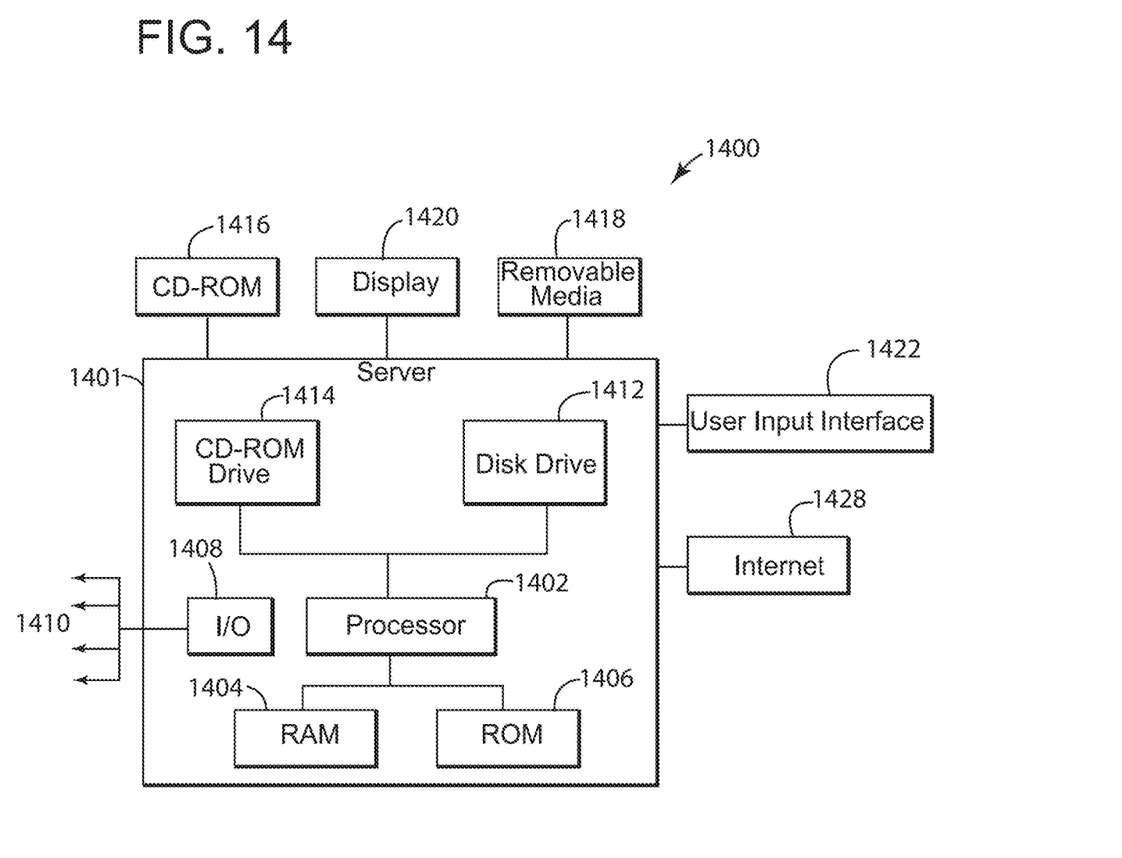
FIG. 14 is a schematic diagram of a data processing apparatus according to an embodiment.

The above-described methods may be performed using the apparatus in FIG. 14. Hardware, firmware, software or a combination thereof may be used to perform the various steps and operations. Apparatus 1400 may include server 1401 having a central processor unit (CPU) 1402 coupled to a random access memory (RAM) 1404 and to a read-only memory (ROM) 1406. ROM 1406 may also be other types of program storage media, such as programmable ROM (PROM), erasable PROM (EPROM), etc. Methods for obtaining an image of an explored subsurface formation may be implemented as computer programs (i.e., executable codes) non-transitorily stored on RAM 1404 or ROM 1406.

Processor 1402 may communicate with other internal and external components through input/output (I/O) circuitry 1408 and bussing 1410, which are configured to obtain detected data related to waves traveling through an explored subsurface formation. Processor 1402 carries out a variety of seismic data processing functions, as dictated by software and/or firmware instructions, and may include plural processing elements cooperating to perform the data processing functions.

Processor 1402 is configured to generate modeled data corresponding to the detected data using a velocity model of the formation, to calculate differences between the modeled data and the detected data, to back-propagate residuals representing the differences, in a predetermined common-data-acquisition domain, to update the velocity model according to preserved amplitude RTM based FWI in the predetermined domain, and to generate an image of geophysical features inside the explored subsurface formation based on the updated velocity model.

Server 1401 may also include one or more data storage devices, including disk drive 1412, CD-ROM drive 1414, and other hardware capable of reading and/or storing information, such as a DVD, etc. In one embodiment, software for carrying out the above-discussed steps may be stored and distributed on a CD-ROM 1416, removable media 1418 or other form of media capable of storing information. The storage media may be inserted into, and read by, devices such as the CD-ROM drive 1414, disk drive 1412, etc. Server 1401 may be coupled to a display 1420, which may be any type of known display or presentation screen, such as LCD, plasma display, cathode ray tube (CRT), etc. Server 1401 may control display 1420 to exhibit various images generated during data processing.

User input interface 1422 includes one or more user interface mechanisms such as a mouse, keyboard, microphone, touchpad, touch screen, voice-recognition system, etc. Server 1401 may be coupled to other computing devices, such as the equipment of a vessel, via a network. The server may be part of a larger network configuration as in a global area network (GAN) such as the Internet 1428, which allows ultimate connection to various landline and/or mobile devices.

The disclosed exemplary embodiments provide preserved-amplitude RTM-based FWI methods for obtaining an image of an explored subsurface formation. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention.

However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for obtaining an image of an explored subsurface formation, the method comprising:
   obtaining detected data related to waves traveling through the explored subsurface formation;
   generating modeled data corresponding to the detected data, using a velocity model of the explored subsurface formation, wherein the velocity model used initially to generate the modeled data is obtained by seismic tomography;
   back-propagating residuals representing differences between the modeled data and the detected data;
   updating the velocity model using a local optimization based on a deconvolution formula employing a backward propagating wavefield and a forward propagating wavefield, the deconvolution formula representing a preserved amplitude reverse time migration (RTM) based full waveform inversion (FWI) for a common data-acquisition-characteristic gather;
   generating the image of geophysical features of the explored subsurface formation based on the updated velocity model; and
   using the image to locate and/or monitor an oil and gas reservoir.

2. The method of claim 1, wherein the common data-acquisition-characteristic gather is in a common shot domain, a common receiver domain, a common surface offset domain, a common subsurface offset domain, a common angle domain or a common plane wave domain.

3. The method of claim 1, wherein the generating of the model data, the calculating of the differences, the back-propagating of the residuals and the updating of the velocity model are performed iteratively until a predetermined criterion is met.

4. The method of claim 1, further comprising:
   monitoring evolution of a cost function E calculated at each iteration as $$E(v) = \|p_{obs}(x_r, t, x_s) - p_{cal}(x_r, t, x_s)\|^2 = \sum_{x_r}\sum_{x_s}\int dt (p_{obs}(x_r, t, x_s) - p_{cal}(x_r, t, x_s))^2$$

where $p_{obs}$ represents the detected data, $p_{cal}$ represents the modeled data, $x_r$ represents a receiver position, $x_s$ represents a shot position, and t is time along a sequence of amplitude values recorded by a receiver at the receiver position after a shot at the shot position.

5. The method of claim 1, wherein the detected data is acquired during a seismic survey.

6. The method of claim 1, wherein the deconvolution formula in a common shot domain used to calculate a perturbation of the velocity model is:

$$\delta v(x) = \frac{v_0^3}{2\pi\rho}\int d\omega \frac{i}{\omega^3}\frac{\nabla p_B \cdot \nabla \overline{p_F} + p_B \nabla^2 \overline{p_F}}{p_F \overline{p_F}}$$

where $v_0$ is the initial velocity, $\rho$ is density, $p_F$ is the forward propagating wavefield from wave source to point x, $p_B$ is the backward propagating wavefield from a receiver to point x, $p_F$ and $p_B$ being based on the velocity model, and w is an angular frequency.

7. The method of claim 6, wherein a density model is maintained constant.

8. The method of claim 1, wherein the updating of the velocity model includes applying a corrective operator to a velocity perturbation calculated using the deconvolution formula.

9. A seismic data processing apparatus, comprising:
   an interface configured to obtain detected data related to waves traveling through an explored subsurface formation; and
   a data processing unit configured
     to generate modeled data corresponding to the detected data using a velocity model of the explored subsurface formation, wherein the velocity model used initially to generate the modeled data is obtained by seismic tomography;
     to calculate differences between the modeled data and the detected data;
     to back-propagate residuals representing the differences;
     to update the velocity model using a local optimization based on a deconvolution formula employing a backward propagating wavefield and a forward propagating wavefield, the deconvolution formula representing a preserved amplitude reverse time migration (RTM) based full waveform inversion (FWI) for a common data-acquisition-characteristic gather;
     to generate an image of geophysical features inside the explored subsurface formation based on the updated velocity model; and
   using the image to locate and/or monitor an oil and gas reservoir.

10. The seismic data processing apparatus of claim 9, wherein the common data-acquisition-characteristic gather is in a common shot domain, a common receiver domain, a common surface offset domain, a common subsurface offset domain, a common angle domain or a common plane wave domain.

11. The seismic data processing apparatus of claim 9, wherein the data processing unit iteratively generates the model data, calculates the differences, back-propagates the residuals and updates the velocity model using the deconvolution formula, until a predetermined criterion is met.

12. The seismic data processing apparatus of claim 10, wherein the data processing unit is further configured to monitor evolution of a cost function E calculated at each iteration as $$E(v) = \|p_{obs}(x_r, t, x_s) - p_{cal}(x_r, t, x_s)\|^2 =$$

-continued $$\sum_{x_r}\sum_{x_s}\int dt (p_{obs}(x_r,t,x_s) - p_{cal}(x_r,t,x_s))^2$$

where $p_{obs}$ represents the detected data, $p_{cal}$ represents the modeled data, $x_r$ represents a receiver position, $x_s$ represents a shot position, and t is time along a sequence of amplitude values recorded by a receiver at the receiver position after a shot at the shot position.

13. The seismic data processing apparatus of claim 9, wherein the detected data is acquired during a seismic survey.

14. The seismic data processing apparatus of claim 9, wherein the deconvolution formula used to calculate a perturbation of the velocity model, in a common shot domain, is:

$$\delta v(x) = \frac{v_0^3}{2\pi\rho}\int d\omega \frac{i}{\omega^3} \frac{\nabla p_B \cdot \nabla \overline{p}_F + p_B \nabla^2 \overline{p}_F}{p_F \overline{p}_F}$$

where $v_0$ is the initial velocity, $\rho$ is density, $p_F$ is the forward propagating wavefield from a wave source to point x, $p_B$ is the backward propagating wavefield from a receiver to the reflector, $p_F$ and $p_B$ being based on the velocity model, and w is an angular frequency.

15. The seismic data processing apparatus of claim 14, wherein the data processing unit updates a current velocity value at a location, by adding a velocity perturbation determined for the location using the deconvolution formula and corrected by applying a corrective operator.

16. A non-transitory computer readable medium storing executable codes which, when executed by a data processing unit having access to detected data related to waves traveling through an explored underground formation, perform a seismic data processing method comprising:
   obtaining the detected data;
   generating modeled data corresponding to the detected data, using a velocity model of the explored underground formation, wherein the velocity model used initially to generate the modeled data is obtained by seismic tomography;
   back-propagating residuals representing differences between the modeled data and the detected data;
   updating the velocity model using a local optimization based on a deconvolution formula employing a backward propagating wavefield and a forward propagating wavefield, the deconvolution formula representing a preserved amplitude reverse time migration (RTM) based full waveform inversion (FWI) for a common data-acquisition-characteristic gather;
   generating the image of geophysical features of the explored subsurface formation based on the updated velocity model; and
   using the image to locate and/or monitor an oil and gas reservoir.

17. The non-transitory computer readable medium of claim 16, wherein the common data-acquisition-characteristic gather in a common shot domain, a common receiver domain, a common surface offset domain, a common subsurface offset domain, a common angle domain or a common plane wave domain.

18. The non-transitory computer readable medium of claim 16, wherein the deconvolution formula in a common shot domain used to calculate a perturbation of the velocity model is:

$$\delta v(x) = \frac{v_0^3}{2\pi\rho}\int d\omega \frac{i}{\omega^3} \frac{\nabla p_B \cdot \nabla \overline{p}_F + p_B \nabla^2 \overline{p}_F}{p_F \overline{p}_F}$$

where $v_0$ is the initial velocity, $\rho$ is density, $p_F$ is the forward propagating wavefield from wave source to point x, $p_B$ is the backward propagating wavefield from a receiver to point x, $p_F$ and $p_B$ being based on the velocity model, and w is an angular frequency.

\* \* \* \* \*